United States Patent Office 3,157,613
Patented Nov. 17, 1964

3,157,613
FLAME RESISTANT COMPOSITION CONTAINING AN ORGANIC POLYMER AND A HALOGENATED DIPHOSPHATE
Richard M. Anderson, St. Louis, and Gail H. Birum, Kirkwood, Mo., assignors to Monsanto Company, a corporation of Delaware
No Drawing. Filed Mar. 7, 1962, Ser. No. 177,965
24 Claims. (Cl. 260—30.6)

This invention relates to organic polymeric compositions and more particularly provides novel polymeric compositions having increased resistance to burning and a method for rendering polymeric compositions flame retardant.

It is an object of this invention to provide methods for increasing the resistance of organic polymeric compositions to the action of flames and for making them more resistant to burning action in general.

It is another object of this invention to provide new and useful polymeric compositions.

It is also an object of this invention to provide flexible, polymer compositions.

It is another object of this invention to provide plasticized polymer compositions having decreased burning characteristics.

An additional object of this invention is to provide in polymer compositions a halogenated diphosphate ester having reduced tendency to volatilize from the polymer compositions when said polymer system is subjected to elevated temperatures.

Other objects, advantages, and aspects of this invention will become apparent from a reading of the specification and the appended claims.

In accordance with this invention a method has been found for reducing the tendency of an organic polymeric composition to burn after a source of burning heat has been removed from the polymeric composition by incorporating into the organic polymeric composition an organic halogenated diphosphate having the formula

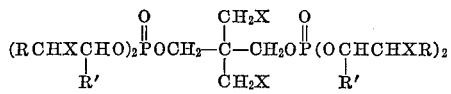

wherein each X is selected from the group consisting of bromine and chlorine; each R is selected from the group consisting of hydrogen, hydrocarbyl, halohydrocarbyl, hydrocarbyloxyalkyl and hydrocarbyl-C(O)O-alkyl radicals; and each R' is selected from the group consisting of hydrogen, lower alkyl, and lower haloalkyl radicals, and is hydrogen when R is hydrocarbyloxyalkyl and when R is hydrocarbyl-C(O)O-alkyl.

Another aspect of this invention provides, as new compositions of matter, an organic material comprising a polymer selected from the group consisting of natural and synthetic linear and cross-linked polymers in contact with not more than an equal amount, based on the weight of the total compositions, of a halogenated diphosphate of the formula, defined above.

In another aspect of this invention, there are provided as new compositions of matter, synthetic copolymeric materials prepared using as a comonomer a halogenated diphosphate having polymerizable groups in the ester moieties bonded to the phosphorus atoms through oxygen.

The halogenated organic diphosphates which are added to, blended with, or in the case of the polymerizable ester, co-polymerized with the polymeric materials to accomplish the above stated objects and aspects are best prepared by the method described in co-pending application of Gail H. Birum, Serial No. 177,964, filed March 7, 1962, filed of even date herewith which is incorporated herein by reference. In general, the halogenated diphosphates are prepared by contacting and re-acting the reaction product of pentaerythritol and a trivalent phosphorus trihalide, i.e., phosphorus trichloride or phosphorus tribromide, the main product of which is the pentaerythritol ester of phosphorochloridous acid, with chlorine or bromine, and then contacting and reacting this resulting reaction product with an epoxide compound of the formula

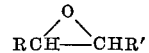

wherein R and R' are as defined above.

The main reaction product of pentaerythritol and a phosphorus trihalide, which reaction product is a starting material in the preparation of compounds of this invention, is the pentaerythritol ester of phosphorochloridous acid having the following general formula:

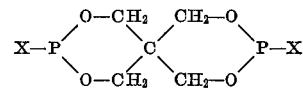

where X is bromine or chlorine. Hence, the reactions of the process of this invention may be summarized according to the following general equations:

(A)
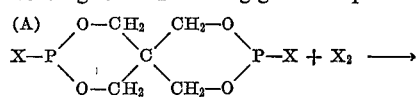

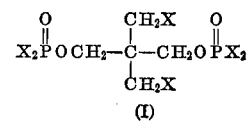
(I)

(B)
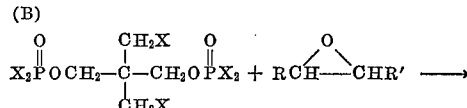

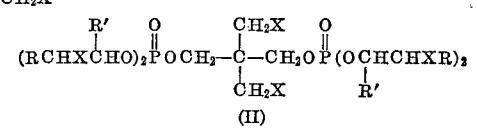
(II)

wherein X, and R and R' are as defined above.

For preparing compounds of type (I) above according to process step (A), the reaction product of pentaerythritol and a trivalent phosphorus trihalide, that is, the pentaerythritol ester of phosphorochloridous acid, is treated with chlorine or bromine. In this reaction the cyclic structures of the starting material are cleaved, and an atom of chlorine or bromine adds to each of the phosphorus atoms thereof as well as to the carbon atoms which are cleaved from the oxygen atoms of each of the heterocyclic rings. For example, when bromine is added to the reaction product of pentaerythritol and phosphorus trichloride, the main product resulting from the reaction which occurs has the structure

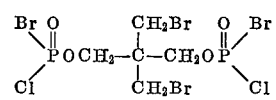

Similarly, when chlorine is added to such a reaction product, the main product is a compound of the formula

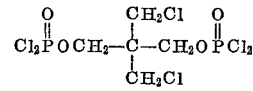

In preparing compounds of type (II) of this invention according to process step (B), the product resulting from the reaction of halogen with the reaction product of pentaerythritol and a trivalent phosphorus trihalide, having as the main product a compound of type (I) described above, is treated with a compound characterized by the formula

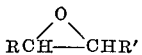

wherein R and R' are as defined above. For example, when an alkylene epoxide such as ethylene oxide is used, the reaction takes place by cleavage of the oxirane ring and bonding of the cleaved

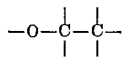

chain through oxygen to a phosphorus atom of the diphosphorodihalidate (compound of type I), the bromine or chlorine atoms initially bonded to phosphorus adding to the other ends of such chains. For example, when propylene oxide is added to a product obtained by reacting bromine with the reaction product of pentaerythritol and phosphorus trichloride, described above, the main product obtained has the formula

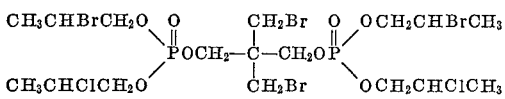

Compounds of the type having the general Formula I, that is, those compounds obtained by reacting a halogen such as chlorine or bromine with the reaction product of pentaerythritol and a trivalent phosphorus trihalide such as phosphorus tribromide or phosphorus trichloride, may be referred to generally as 2,2-bis(halomethyl)-1,3-propylenebis-(phosphorodihalidates). Examples of such compounds are:

2,2-bis(chloromethyl) - 1,3 - propylenebis(phosphorodichloridate) obtained by reaction of chlorine with the reaction product of pentaerythritol and phosphorus trichloride;

2,2-bis(chloromethyl) - 1,3 - propylenebis(phosphorobromido-chloridate) obtained by reaction of chlorine with the reaction product of pentaerythritol and phosphorus tribromide;

2,2-bis(bromomethyl) - 1,3 - propylenebis(phosphorobromido-chloridate) obtained by reaction of bromine with the reaction product of pentaerythritol and phosphorus trichloride; and 2,2-bis(bromomethyl) - 1,3 - propylenebis(phosphorodibromidate) obtained by reaction of bromine with the reaction product of pentaerythritol and phosphorus tribromide.

In preparing halogenated organophosphorus compounds of type (II) above, the bis(halomethyl)-1,3-propylenebis(phosphorodihalidates) are contacted with an epoxy compound of the formula

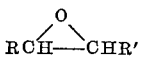

wherein R and R' are as degned above. Oxirane compounds having terminal epoxy groups, that is, epoxy compounds of the above type wherein R' is hydrogen, are usually preferred. However, for many applications pure products are not essential and in such cases products containing isomeric compounds may be used as effectively as a pure material. In such cases, the choice of epoxide to be used is much wider. Various aliphatic, aromatic, and alicyclic groups may be attached directly to the epoxy groups or said groups may be attached through a hydrocarbyloxyalkyl or a hydrocarbyl-C(O)O-alkyl group to the epoxy group. It is preferred that R and R' be so selected that the oxirane reactant has from 2 to 12 carbon atoms per molecule. However, oxirane compounds having from 2 to 12 carbon atoms are only stated as a preferred form of the invention, and epoxide compounds having R and R' so selected that the total carbon atom content of the epoxide reactant is greater than 12 are operative. Compounds of this type are especially preferred when only part of the halogen atoms on the phosphorus atoms of the compounds of type I are to be replaced initially, and the remaining phosphorus-bonded halogen atoms are to be reacted with an epoxide having fewer carbon atoms than 12 so that the average carbon-content of each of the ester radicals of the diphosphate final product is about 12 carbon atoms or less. Such higher molecular weight epoxides of the above type having, say, up to 20 carbon atoms may be preferred as the only epoxide reactant in the preparation of some products of this invention. Compounds of type (II) having an average molecular weight in the range of about 550 to 1400 are of optimum value for most cases in preparing chemicals which are to be added to polymer compositions for decreasing the flammability characteristics of said polymer compositions. Higher molecular weight epoxy compounds may be used, but they increase the molecular weight of the final product proportionally and also increase the time needed to effect complete reaction. Also it is to be understood that compounds of type (II) can be prepared having a preferred molecular weight by choosing to use a higher molecular weight epoxide for reaction with some of the halogen bonded to the phosphorus atoms, and then completing the synthesis with a lower molecular weight epoxide to replace the remaining 1, 2, or 3 halogen atoms from the phosphorus atoms in the bis(halomethyl)-propylene-bis(phosphorodihalidate) compounds. Thus, the carbon atom content of each of the phosphorus bonded ester moieties containing R and R' in the compounds of type II, above, may range from 2 to about 20 carbon atoms but the average carbon content in these phosphorus bonded ester radicals of a given halogenated diphosphate molecule should be from 2 to about 12 carbon atoms for each of such ester moieties.

Examples of simple useful oxirane compounds that may be used are ethylene oxide, propylene oxide, mixtures of the two, epichlorohydrin, epibromohydrin, epifluorohydrin, phenyl glycidyl ether, and butadiene monoxide.

Additional illustrative examples of oxirane reactants of the above indicated type that may be used to prepare compounds of type (II) defined above are those having the epoxy group in terminal positions in the compounds. Examples of those types wherein R' is hydrogen and R is a hydrocarbyl, or a halohydrocarbyl radical, are those wherein R is an alkyl, alkenyl, alkynyl, cycloalkyl, cycloalkenyl, aryl, aralkyl, alkaryl radical or a halogenated derivative thereof, preferably a chlorinated or brominated radical of the above types. Such compounds include 1,2-epoxybutane,
1,2-epoxypentane,
1,2-epoxyheptane,
1,2-epoxydecane,
1,2-epoxydodecane,
1,2-epoxytetradecane,
1,2-epoxyoctadecane,
1,2-epoxy-4-bromobutane,
1,2-epoxy-6-bromohexane,
1,2-epoxy-4-chlorononane,
1,2-epoxy-6-bromododecane,
1,2-epoxy-5-hexene,
1,2-epoxy-8-nonene,
1,2-epoxy-7-undecene,
1,2-epoxy-6-bromo-4-hexene,
1,2-epoxy-4-chloro-6-heptene,
1,2-epoxy-8-chloro-10-dodecene,
1,2-epoxy-4-pentyne,
1,2-epoxy-5-hexyne,
1,2-epoxy-8-decyne,
1,2-epoxy-11-dodecyne,
1,2-epoxy-3-chloro-4-hexyne,
1,2-epoxy-8-bromo-10-undecyne,
1,2-epoxy-3-cyclohexylpropane,
1,2-epoxy-4-cyclopentylbutane,
1,2-epoxy-3-(2-4-dichlorocyclohexyl)propane, 1,2-epoxy-3-cyclopropylpropane,
1,2-epoxy-3-cyclobutylpropane,
1,2-epoxy-4-(cyclohexenyl)butane,
1,2-epoxy-3-(2,4'-dichlorobiphenylyl)propane,
phenylethylene oxide,
2,4,5-tribromophenylethylene oxide,
4-isopropylphenylethylene oxide,
1,2-epoxy-3-(4-vinylphenyl)propane, and
1,2-epoxy-3-(indenyl)propane.

Illustrative examples of useful oxirane compounds of the above type wherein R' is hydrogen and R is a hydrocarbyloxyalkyl radical are 1,2-epoxy-3-ethoxy propane, 1,2-epoxy-4-hexyloxybutane, 1,2-epoxy-4-octyloxybutane, 1,2-epoxy-3-allyloxypropane, 1,2-epoxy-4-propynyloxybutane, 1,2-epoxy-3-cyclohexyloxypropane, 1,2-epoxy-4-(3-cyclohexenyloxy)butane, and 1,2-epoxy-6-(2-phenylethoxy)hexane.

Non-terminal epoxides that can be used include those wherein R and R' are of the same or different types of radicals. Where R and R' are not the same, mixtures of isomeric products will in some cases be obtained. But this fact is not material to the use of the product as a flame-retardant chemical since the isomers possess the same utility. Examples of such reactants are 2,3-epoxybutane, 2,3-epoxypentane, 4,5-epoxyoctane, 2-bromo-3,4-epoxyhexane, 1,8-dichloro-4,5-epoxyoctane, 3,4-epoxy-2 - hexene, 1,2 - dichloro - 3,4 - epoxy - 1 - octene, 3,4-epoxy-1-hexyne, 10-chloro-5,6-epoxy-1-dodecyne, 1-cyclopentyl-3,4-epoxyhexane, 1-chloro-3-(3-cyclohexenyl)-2,3-epoxypropane, 2,3-epoxy-4-phenylbutane, and 3,4-epoxy-4-(p-tolyl)butane.

Epoxy-containing esters of unsaturated carboxylic acids having olefinic or acetylenic bonds may also be used. Examples of such compounds are: glycidyl acrylate, 3,4-epoxybutyl propiolate, 2,3-epoxypropyl alpha-methacrylate, 4,5-epoxypentyl 3-butynoate, 5,6-epoxyhexyl octenoate, 2,3-epoxypropyl undecenoate, 2,3-epoxypropyl oleate, and 3,4-epoxybutyl crotonoate.

By reacting epoxy-containing compounds having unsaturated groups with a 2,2-bis(halomethyl)-1,3-propylenebis(phosphorodihalidate), polymerizable monomers are obtainable. A particularly useful class of epoxy-containing reactants containing unsaturated groups are the epoxy-containing esters of unsaturated acids. Thus, for example, by reacting 1 molar proportion of 2,2-bis(bromomethyl) - 1,3 - propylenebis(phosphorobromidochloridate) with 2 molar proportions of 3,4-epoxybutyl alpha-methacrylate, and then with 2 molar proportions of ethylene oxide, a polymerizable monomer 2,2-bis(bromomethyl) - 1,3 - propylenebis[2 - bromo - 4 - methacrylyloxybutyl 2-chloroethyl phosphate] is obtained. Similarly, by reacting 1 molar proportion of 2,2-bis(bromomethyl)-1,3-propylenebis(phosphorodibromidate) with 4 molar proportions of glycidyl crotonate, there is obtained 2,2 - bis(bromomethyl) - 1,3 - propylenebis[bis(2 - bromo-3-crotonyloxypropyl)phosphate].

When polymerizable halogenated diphosphate ester monomers are being prepared, the 2,2-bis(halomethyl)-1,3-propylenebis(phosphorodihalidate) and appropriate epoxide reactants are admixed preferably in the presence of a catalyst, diluent or solvent, and a polymerization inhibitor of any type that is suitable for inhibiting polymerization of the diphosphate ester product being prepared. Polymerization inhibitors such as 1,3,5-trinitrobenzene, hydroquinone, hydroquinine monomethyl ether, tannic acid cuprous chloride, phenol, naphthols, may be used. The polymerization inhibitor may be added to the reaction mixture by any suitable method, a preferred method being the introduction of the inhibitor admixed with the epoxide reactant.

A few examples of compounds of type II, defined above, and the reactants from which they are obtained by reaction of the indicated bis(halomethyl)-propylenebis(phosphorodihalidates) (compounds of type I) with the indicated oxirane compound are:

2,2 - bis(chloromethyl) - 1,3 - propylenebis[bis(2 - chloroethyl) phosphate] obtained by reaction of ethylene oxide with 2,2-bis(chloromethyl)-1,3-propylenebis-(phosphorodichloridate); 2,2 - bis(chloromethyl) - 1,3-propylenebis[2 - bromopropyl 2 - chloropropyl phosphate] obtained by reaction of propylene oxide with 2,2 - bis - (chloromethyl) - 1,3 - propylenebis(phosphorobromidochloridate);

2,2 - bis(bromomethyl) - 1,3 - propylenebis[2,3 - dichloropropyl 2-bromo-3-chloropropyl phosphate] obtained by reaction of epichlorohydrin with 2,2-bis(bromomethyl) - 1,3 - propylenebis(phosphorobromidochloridate);

2,2 - bis(bromomethyl) - 1,3 - propylenebis(3 - phenoxy-2-chloropropyl 3-phenoxy-2-bromopropyl phosphate) obtained by reaction of phenyl glycidyl ether with 2,2-bis - (bromomethyl) - 1,3 - propylenebis(phosphorobromidochloridate); and 2,2 - bis(bromomethyl) - 1,3 - propylenebis[bis(2 - bromo-3-butenyl) phosphate] obtained by reaction of butadiene-monoxide with 2,2-bis(bromomethyl)-1,3-propylenebis-(phosphorodibromidate).

Additional examples are:

2,2 - bis(bromomethyl) - 1,3 - propylenebis(2 - bromo-11 - dodecenyl 2 - chloro - 11 - dodecenyl phosphate) obtained by reaction of 1,2-epoxy-11-dodecene with 2,2 - bis(bromomethyl) - 1,3 - propylenebis(phosphorobromidochloridate);

2,2 - bis(chloromethyl) - 1,3 - propylenebis(2 - chloro - 4-pentynyl 2-chloroethyl phosphate) obtained by reaction of 2,2-bis(chloromethyl)-1,3-propylenebis(phosphorodichloridate) with 1,2-epoxy-4-pentyne and then with ethylene oxide;

2,2 - bis(bromomethyl) - 1,3 - propylenebis(2 - bromo-3-naphthylpropyl 2-chloropropyl phosphate) obtained by reaction of 2,2-bis(bromomethyl)-1,3-propylenebisphosphorobromidochloridate) with 1,2-epoxy-3-naphthylpropane and then with propylene oxide;

2,2 - bis(bromomethyl) - 1,3 - propylenebis(2 - bromo - 6-chlorohexyl 2-bromoethyl phosphate obtained by reaction of 2,2-bis(bromomethyl)-1,3-propylenebis(phosphorodibromidate) with 1,2-epoxy-6-chlorohexane and with ethylene oxide;

2,2 - bis(chloromethyl) - 1,3 - propylenebis[bis(2 - chloro-1-methylpropyl) phosphate] obtained by reaction of 2,2 - bis(chloromethyl) - 1,3 - propylenebis(phosphorodichloridate) with 2,3-butylene oxide;

2,2 - bis(bromomethyl) - 1,3 - propylenebis(2 - bromo - 1-butylhexyl 2-chloro-1-butylhexyl phosphate) obtained by reaction of 2,2 - bis(bromomethyl) - 1,3 - propylenebis(phosphorobromidochloridate) with 5,6-epoxydecane.

The following examples illustrate the type of products obtained when the epoxide used is one wherein R is a hydrocarbyloxyalkyl or a hydrocarbylcarboxyalkyl radical:

2,2 - bis(chloromethyl) - 1,3 - propylenebis[bis( 2 - chloro-3-phenoxypropyl) phosphate] obtained by reaction of 2,2-bis(chloromethyl)-1,3-propylenebis(phosphorodichloridate) with glycidyl phenyl ether;

2,2 - bis(bromomethyl) - 1,3 - propylenebis(2 - bromo - 5-butenyloxypentyl 2 - chloropropyl phosphate) obtained by reacting 2,2 - bis(bromomethyl) - 1,3 - propylenebis(phosphorobromidochloridate) with 1,2-epoxy-4-butenyloxypentane and then with propylene oxide;

2,2 - bis(bromomethyl) - 1,3 - propylenebis(2 - bromo - 4-propynyloxybutyl 2-bromobutyl phosphate) obtained by reaction of 2,2-bis(bromomethyl)-1,3-propylenebisphosphorodibromidate) with 1,2-epoxy-3-propynyloxybutane and then with 1,2-epoxybutane;

2,2 - bis(bromomethyl) - 1,3 - propylenebis(2 - bromo - 3-acrylyloxypropyl 2-chloro-3-acrylyloxypropyl phosphate) obtained by reacting 2,2-bis(bromomethyl)-1,3-propylenebis(phosphorobromidochloridate) with glycidyl acrylate;

2,2 - bis(chloromethyl) - 1,3 - propylenebis(2 - chloro - 4-octylcarboxybutyl 2-chlorohexyl phosphate) obtained by reaction of 2,2-bis(chloromethyl)-1,3-propylenebis-(phosphorodichloridate) with 1,2-epoxy-4-octylcarboxybutane and then with 1,2-epoxyhexane; and 2,2 - bis(bromomethyl) - 1,3 - propylenebis(2 - bromo - 4-methacrylyloxybutyl 2-bromo-3- chloropropyl phosphate) obtained by reaction of 2,2-bis(bromomethyl)-1,3 - propylenebis(phosphorodibromidate) with 1,2-epoxy-4-methacrylyloxybutane and then with epichlorohydrin.

The final product of this invention may contain isomers and some products resulting from side reactions in the intermediate steps of its preparation.

One of these side reactions occurs during the reaction of pentaerythritol and the trivalent phosphorus trihalide and results in the formation of structure (III) which when carried through the steps of the process involving reaction with halogen and then with an epoxy compound of the above types, produces products which are only partially like compounds of type (II) above. The formation of these side-reaction products may be summarized by the following general equations.

$C(CH_2OH)_4 + PX_3 \longrightarrow$

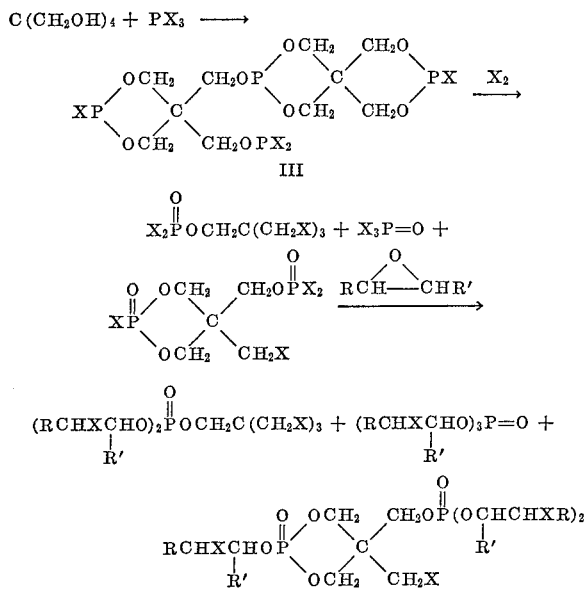

The above side-reaction products may be eliminated by purification of the intermediate pentaerythritol ester of phosphorochloridous acid,

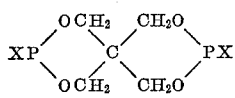

but it is preferred to retain them since they do not appreciably degrade the properties of the final product.

Another side reaction introduces positional isomers as a result of halogen interchange during the reaction of the pentaerythritol-phosphorus trihalide intermediate with elemental halogen that is of a different type than the halogen bonded to phosphorus in the intermediate. For example, when the product from pentaerythritol and $PCl_3$ is treated with $Br_2$, some product having structure IV may be obtained along with the major intermediate V.

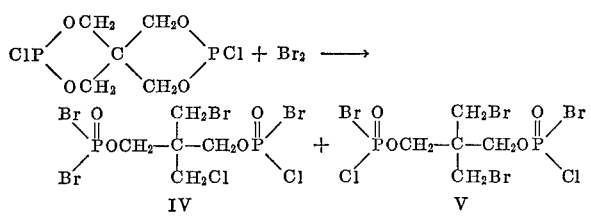

Reaction of a mixture of IV and V with an epoxide then gives a mixture of isomers VI and VII, respectively.

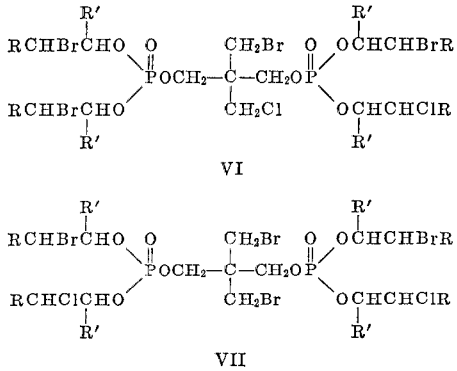

A third type of side reaction is that which introduces isomeric ester radicals bonded to the phosphorus atoms of the final product. This type of side reaction may occur in some instances when the 2,2-bis(halomethyl)-1,3-propylenebis(phosphorodihalidate) compounds (compounds of type I) are reacted with epoxides of the formula

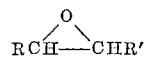

where R and R' are different radicals. This type of isomer does not occur in the product when R and R' are the same. For example, when 2,2-bis(chloromethyl)-1,3-propylenebis(phosphorodichloridate) is reacted with ethylene oxide, that is, with a compound wherein R and R' are both hydrogen atoms, only one type of product is obtained, namely 2,2 - bis(chloromethyl) - 1,3-propylenebis[bis(2-chloroethyl) phosphate]. However, if the epoxide used is one wherein R and R' are different, isomer mixtures may be obtained. For example, if propylene oxide is reacted with 2,2-bis-(bromomethyl)-1,3-propylenebis(phosphorobromidochloridate), there may be obtained besides 2,2-bis-(bromomethyl) - 1,3 - propylenebis[(2-bromopropyl) (2-chloropropyl) phosphate] isomeric products such as 2,2 - bis(bromomethyl)-1,3-propylenebis[(2 - chloro-1-methylethyl) (2-bromopropyl) phosphate]. Since there is a preferential tendency for cleavage of the epoxy ring to occur between the substituted carbon atom and oxygen, e.g., in cases where R' is hydrogen, the ester radicals of the product are predominantly the β-halo esters of the first indicated type. However, there may be formed also varying proportions of the isomeric products by cleavage of the epoxy ring between the oxygen atom and the unsubstituted carbon.

In view of the above, it will be apparent to those skilled in the art that the invention provides a method of preparing numerous halogenated diphosphate esters having chlorine, bromine, and mixtures of chlorine and bromine as substituents in the epoxide-derived portions of the phosphorus esters.

As already stated, the process of this invention involves the following steps: the reaction product of pentaerythritol and a trivalent phosphorus trihalide is treated with a halogen such as chlorine or bromine to obtain a product of type (I) above. A compound of type (I) is then reacted with an epoxy compound of the above described type to obtain a product of type (II).

A valuable aspect of this invention provides a method for preparing halogenated organic diphosphate esters without isolation of intermediately formed products by starting with pentaerythritol, a trivalent phosphorus trihalide, and chlorine or bromine. Thus, a presently preferred method comprises the following steps: the pentaerythritol and the trivalent phosphorus trihalide are mixed in the presence or absence of a solvent or diluent and warmed until cessation of hydrogen halide evolution. The resulting reaction mixture is treated with chlorine or bromine until reaction is complete as indicated by termination of heat of reaction or cessation of decoloration of halogen. The halogenation product thus obtained is treated with an epoxy compound of the described type to give halogenated organic diphosphate ester products. A diluent or solvent may preferably be used. The reactions of the process can all be effected in one reaction vessel without isolating any intermediate products, except the hydrogen halide evolved in the first step and any diluent or solvent which may have been used. The halogenated organic diphosphate products may be used directly for a variety of industrial and agricultural purposes, but if desired, these products may be purified, e.g., by washing with aqueous alkali and water, by treatment with adsorptive agents, or by filtration.

The pentaerythritol ester of phosphorohalidous acid is stoichiometrically speaking, the product of 1 molar proportion of pentaerythritol and 2 molar proportions of the phosphorus trichloride or tribromide. To prepare such compounds, it is generally preferred to use a slight excess, say, from 2% to 25% excess, of phosphorus trichloride or tribromide over the amount theoretically required. However it is contemplated within the scope of this invention to use reaction products of pentaerythritol and the phosphorus trihalide derived by using different molar proportions of pentaerythritol to trivalent phosphorus trihalide than the preferred proportions mentioned above. For example, in the process of this invention pentaerythritol-phosphorus trihalide products derived from as little as one and one-third moles of phosphorus trihalide per mole of pentaerythritol may be used. Thus, a reaction product obtained by reacting, say, one mole of pentaerythritol with one and one-half moles of phosphorus trichloride gives an intermediate which may be used within the scope of this invention. However, the use of less than two moles of phosphorus trihalide per mole of pentaerythritol results in all of the halogen being displaced from some of the phosphorus atoms. Such reaction products are complex, difficultly identifiable, and generally of less value for preparing products having flame retardant applications than are those obtained by using the pentaerythritol-trivalent phosphorus reaction products derived by reacting two moles or more of the phosphorus trihalide per mole of pentaerythritol. Nevertheless, where pure products are not essential, such reaction products may be used within the process of this invention to prepare chemical products which are not necessarily equivalent in effectiveness in flame-retardant applications. The description of the invention will proceed by describing the use of the preferred pentaerythritol-trivalent phosphorus trihalide reaction product, but it is understood that it is not intended that the invention should be limited thereto.

Reaction of pentaerythritol with phosphorus trichloride or tribromide proceeds readily with application of moderate warming. Isolation of the reaction products is not required, except for the removal of hydrogen halide by-product, because reaction of the pentaerythritol with phosphorus trihalide proceeds substantially to completion; likewise, the bromination or the chlorination and the subsequent reaction with the epoxy reactant proceeds so smoothly and completely that there is no appreciable deleterious quantities of materials other than the desired halogenated diphosphate esters in the final reaction mixture. Since the halogenation and epoxide reaction steps both involve addition, no by-product formation is involved. However, if desired, the products of side-reactions, which occur as described above, may be eliminated by purifying the intermediate material, that is, the pentaerythritol ester of phosphorochloridous acid, and then proceeding with the halogenation and the epoxidation steps to obtain a product of type (II). An important aspect of the present invention, then, is the method of preparing mixed halogenated diphosphate esters which comprises addition of chlorine or bromine to the reaction product of pentaerythritol and a trivalent phosphorus trihalide until cessation of bromine or chlorine reaction and then treating the resulting reaction product with an epoxide of the formula

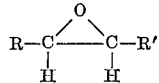

Of course, if desired, the presently provided halogenated diphosphate esters can be prepared wherein all of the halogen in the compounds is chlorine or bromine by using phosphorus trichloride and chlorine or phosphorus tribromide and bromine. However, for flame retardant purposes, it may be particularly desirable to prepare mixed halogen diphosphate esters by first reacting pentaerythritol with phosphorus trichloride and then treating the resulting reaction product with elemental bromine until discoloration ceases, and finally, treating the resulting reaction product with an epoxide of the described types to form the chlorine and bromine containing esters. Conversely, products may be obtained by first allowing pentaerythritol and phosphorus tribromide to react, and then treating the resulting reaction product with elemental chlorine and finally with an epoxy compound as above.

Where the 2,2-bis(halomethyl)-1,3-propylenebis-(phosphorodihalidates), that is, the compounds of type (I), have been prepared so as to contain both bromine and chlorine bonded to phosphorus, halogenated diphosphate esters [compounds of type (II)] having different ester radicals can be prepared in a simple manner by taking advantage of the fact that bromine atoms bonded to phosphorus react with expoxides preferentially to the chlorine atoms bonded to phosphorus. Thus, by reacting a compound such as 2,2-bis(bromomethyl)-1,3-propylenebis(phosphorobromidochloridate) with an epoxide such as 2,3-butylene oxide in an amount which is equivalent to the bromine bonded to phosphorus atoms until reaction is complete, and then with an expoxide such as 1,2-epoxy-3-allyloxypropane in an amount equivalent to the chlorine bonded to phosphorus, there is obtained as the main product 2,2-bis(bromomethyl)-1,3-propylenebis[2 - bromo - 1-methylpropyl 2-chloro-3-allyloxypropyl phosphate].

In preparing the 2,2-bis(halomethyl)-1,3-propylenebis(phosphorodihalidates), the elemental halogen is added to the reaction product of pentaerythritol and phosphorus trihalide until the reaction is complete, e.g., as is indicated by the cessation of dicoloration of the added halogen and/or by the cessation of heat of reaction. So long as the reaction is taking place, the halogen is decolorized substantially as rapidly as it is added. The reaction may be moderated by means well known to those skilled in the art, e.g., by cooling, by the use of an inert solvent or diluent, by stirring, by a combination of such means, etc. Any temperature at which the desired products are formed without substantial decomposition taking place may be used. Generally, temperatures on the order of $-25°$ C. to $100°$ C. can be used, the preferred temperature being in the $0°$ C. to $50°$ C. range. When the halogen ceases to become decolorized, the halogenation reaction may be said to be complete, that is, the reaction product is mainly a 2,2-bis(halomethyl)-1,3-propylenebis(phosphorodihalidate) having a generic formula of type (I) above.

Since formation of the 2,2-bis(halomethyl)-1,3-propylenebis(phosphorodihalidate) takes place by reaction of 1 mole of the pentaerythritol ester of phosphorochloridous acid with two moles of the halogen, these reactants are advantageously used in such stoichiometric proportions. An excess of halogen can be used, of course, since such an excess would involve only the necessity of removing the unreacted material from the halogenation product.

The presently provided 2,2-bis(halomethyl)-1,3-propylenebis(phosphorodihalidates) are stable, well-characterized compounds which are also advantageously employed for purposes other than for the preparation of the halogen-containing phosphate esters of this invention. The chlorine and bromine atoms which are attached to the phosphorus atoms are both very reactive; hence, esters may be prepared therefrom by reaction with alcohols or mercaptans, and phosphoramides by reaction with amines. The chlorine and bromine atoms display different degrees of reactivity, so that in many instances partial esters can be selectively prepared. The 2,2 - bis(halomethyl) - 1,3 - propylenebis(phosphorodihalidates) are also advantageously employed as treating agents for cellulosic materials and other substances having a plurality of hydroxy groups, e.g., polyvinyl alcohol, and the sugars and starches. Reaction of these compounds with such materials generally impart flame-proofing properties thereto and, depending upon the nature of the individual 2,2 - bis(halomethyl)-1,3-propylenebis(phosphorodihalidate) and the material treated therewith, there will be obtained, in addition to the flame-retardance, an improvement in "hand" and "feel," crease-resistance, etc.

As stated above, the 2,2-bis(halomethyl)-1,3-proplenebis(phosphorodihalidates) are particularly valuable as intermediates or starting materials for the production of mixed halogenated diphosphate esters containing both bromine and chlorine in the ester radicals. Reaction of a 2,2-bis(halomethyl)-1,3-propylenebis(phosphorodihalidates) with epoxy compounds, disclosed above, to give mixed halogenated disphosphate esters generally proceeds substantially quantitatively; and since the reaction is one of addition, here again, as in the case of the halogenation reaction there is involved no formation of by-products. Since production of the halogenated diphosphate esters involves addition of four moles of the epoxy compound to one mole of the 2,2-bis-(halomethyl)-1,3-propylenebis(phosphorodihalidate), these reactants are advantageously used in such stoichiometric proportions; however, an excess of the epoxide reactant may be used to insure completion of the reaction since any unreacted material can be separated from the desired diphosphate ester product.

Reaction of the 2,2-bis(halomethyl)-1,3-propylenebis-(phosphorodihalidate) with the epoxy compound to give the presently provided halogenated diphosphate esters proceeds at ordinary, decreased or increased temperatures and in the presence or absence of catalysts. The use of catalysts is preferred in that reaction time is thereby substantially decreased, use of a lower reaction temperature is facilitated, and yields of diphosphate ester product are materially improved. As catalysts there may be employed, e.g., such compounds as titanium tetrachloride, zirconium tetrachloride, aluminum chloride, ferric chloride, boron trifluoride, tin tetrachloride, iron filings, ammonium metavanadate, phosphorous trichloride, phosphorus tribromide, pyridine, tri-n-butylamine, quinoline, aniline, N,N-diethylaniline, tetrabutyl titanate, etc. Inert liquid solvents or diluents may or may not be employed. Diluents such as benzene, toluene, hexane, heptane, chloroform, carbon tetrachloride, ethylene dichloride, 1,1,2-trichloroethane, chlorobenzene, etc., may be used and are especially valuable where higher molecular weight compounds are being prepared. The reaction is generally conducted at moderately elevated temperatures; but, depending upon the nature of the individual reactants and upon the nature of the catalyst, temperatures of say, from 0° C. to 150° C. may be used, the preferred temperature being in the 25° C. to 125° C. range. The addition reaction is generally exothermic; hence, in initial runs it is advisable to employ external cooling. Heating may be required to assure completion of the reaction and be desirable throughout the reaction when using the less reactive, higher molecular weight epoxides or when operating either in the absence of a catalyst or in the presence of catalyst materials of comparatively low efficiency. The selection of the proper operating temperature as related to the nature of reactants, catalyst used, and the quantities thereof can easily be arrived by one skilled in the art.

Step (B) of the process may be satisfactorily conducted by addition of the epoxide reactant to a reaction vessel containing the 2,2-bis(halomethyl)-1,3-propylenebis(phosphorodihalidate). However, in conducting this step of the process it is sometimes preferred to simultaneously add the epoxide and the 2,2-bis(halomethyl)-1,3-propylenebis(phosphorodihalidate) to the reaction vessel containing a solvent or diluent, with the epoxide preferably being added in slight stoichiometric excess and the temperature being maintained at a level that will promote rapid and complete reaction. The product of the reaction between the epoxide and the 2,2-bis(halomethyl)-1,3-propylenebis(phosphorodihalidate) in some cases can serve as sufficient solvent or diluent for the reaction. Thus, by this process modification the reactants can be added to the reaction vessel substantially continuously until the vessel is filled to the desired capacity with diphosphate ester product, the vessel emptied of some of its contents, and the reaction continued, using some of the product as diluent or solvent. The presently provided halogenated diphosphate esters are useful for a variety of industrial purposes, e.g., as preignition-inhibiting agents in organo-lead-containing hydrocarbon fuels, such as gasoline compositions used in internal combustion engines, as anti-oxidant, anti-wear, and extreme pressure-imparting additives to hydrocarbon lubricant oil-based compositions. They are particularly useful as modifiers for natural and synthetic polymeric materials. The present halogenated diphosphates possess a high degree of utility as flame retardants for polymeric materials. At the same time, depending upon the quantity of the halogenated diphosphate ester which is in contact with the polymer, plasticizing or softening effect is obtained. Thus, at, say, a 10% to 50% concentration of the halogenated diphosphate, based upon the total of polymer and phosphate, the polymer generally not only is flame-proofed but also plasticized. Use of the present halogenated diphosphates at much lower concentrations, say, in an amount which in some cases is as low as 1.0%, provides many polymeric systems with reduced burning rates. The present halogenated diphosphates may be used with the polymers in a quantity which is equal to that of the polymer, but in most instances favorable results with respect to improvement in flame-retardance and/or plasticity is obtained at concentrations which are definitely lower. It will be evident, of course, that for the preparation of plastisols, quantities of the halogenated diphosphates which are greater than that of the polymer will be required. Use of the present halogenated diphosphate compounds with the polymeric materials in quantities which confer beneficial properties to the polymers with respect to a desired effect, e.g., flexibility in the case of a film, flame-proofing in the case of foam insulators and extruded fibers or molded pieces, often confers to the polymer an improvement also in such characteristics as resistance to impact, dimensional stability, moldability, etc. Having been provided the present disclosure, these varied effects are readily determinable by those skilled in the art simply by visual observation or by use of conventional techniques. Hence in order to arrive at optimum beneficial effect suited to the purposes for which polymeric composition is designed, only rountine testing, involving variation of adjuvant quantity, is generally required, although in some instances one of more members of the whole class of the presently provided halogenated diphosphates will be found to impart a degree of modification at a low concentration which can be attained by other members of the class at significantly higher concentrations.

Fibrous cellulosic products are prime examples of the natural polymeric materials which are advantageously modified by the present halogenated diphosphates. This includes products made of cotton, linen, regenerated cellulose, kapok, hemp, wood and wood pulp, etc., textiles, twines, paper, cardboard, pressed board, batting, wood flour, sawdust, etc. Another group of natural polymers of carbohydrate origin includes the starches such as those derived from corn, barley, potato and cassava. Another class of natural polymers with which the present halogenated diphosphates are beneficially used are the natural gums, etc., gum arabic, psyllium seed, tragacanth and gum karaya. Natural rubber is also included. Natural resins modified by the present halogenated diphosphates include shellac, copal, damar, pine balsam, rosin, etc. Proteinaceous polymeric materials, etc. animal glue, casein, wool and leather are also advantageously modified by said halogenated diphosphorus compounds. The natural polymeric products, generally, are rendered flame-retardant when contacted with the present halogenated diphosphates in appropriate proportions, and worthy of special note is the glow-proofing of readily ignitible dusts and powders prepared from the natural polymers. Plasticizing effect is conferred by the present halogenated diphosphates to those of the polymers which lack the degrees of softness and flexibility that are required in the applications for which the polymers are destined. When cotton fibers or textiles are treated with halogenated diphosphate compounds, there is not only flame-retardant effect but also an improvement in the "hand" or feel of the fabric.

Synthetic polymeric materials, i.e., those high molecular weight materials which are not found in nature, with which the present halogenated diphosphates are advantageously employed may be either linear or cross-linked polymers and they may be either those which are produced by addition polymerization or by condensation.

An important class of polymers which are beneficially modified according to the invention are those obtained from a polymerizable monomer compound having ethylenic unsaturation.

A particularly preferred class of polymers flame-proofed hereby consists of the polymerized vinyl and vinylidene compounds, i.e., those having the $CH_2=C<$ radical. Compounds having such a radical are, e.g., the solid polymeric alkenes, such as polyethylene, polypropylene, polyisobutylene or ethylene-propylene copolymer; polymerized acrylyl and alkacrylyl compounds such as acrylic, chloroacrylic and methacrylic acids, anhydrides, esters, nitriles and amides, for example, acrylonitrile, ethyl or butyl acrylate, methyl or ethyl methacrylate, methoxymethyl or 2-(2-butoxyethoxy)ethyl methacrylate, 2-(cyanoethoxy) ethyl 3-(3-cyanopropoxy) propyl acrylate or methacrylate, 2-(diethylamino)ethyl or 2-chloroethyl acrylate or methacrylate, acrylic anhydride or methacrylic anhydride; methacrylamide or chloroacrylamide, ethyl or butyl chloroacrylate; the olefinic aldehydes such as acrolein, methacrolein and their acetals; the vinyl and vinylidene halides such as vinyl chloride, vinyl fluoride, vinylidene fluoride and 1-chloro-1-fluoroethylene; polyvinyl alcohol; the vinyl carboxylates such as vinyl acetate, vinyl chloroacetate, vinyl propionate, and vinyl 2-ethyl-hexanoate; the N-vinyl imides such as N-vinylphthalimide and N-vinyl-succinimide; the N-vinyllactams such as N-vinylcaprolactam and N-vinylbutyrolactam; the vinyl aromatic hydrocarbon compounds such as styrene, α-methylstyrene, 2,4-dichlorostyrene, α- or β-vinylnaphthalene, divinylbenzene and vinylfluorene; the vinyl ethers such as ethyl vinyl ether or isobutyl vinyl ether; vinyl-substituted heterocyclic compounds such as vinylpyridine, vinylpyrrolidone, vinylfuran or vinylthiophene; the vinyl or vinylidene ketones such as methyl vinyl ketone or isopropenyl ethyl ketone; vinylidene cyanide; etc. Homopolymers of the above compounds or copolymers or terpolymers thereof are beneficially modified by the present halogenated diphosphates. Examples of such copolymers or terpolymers are those obtained by polymerization of the following monomer mixtures: vinyl chloride-vinyl acetate, acrylonitrile-vinylpyridine, styrene-methyl methacrylate; styrene-N-vinylpyrrolidone, cyclohexyl methacrylate-vinyl chloroacetate, acrylonitrile-vinylidene cyanide, methyl methacrylate- vinyl acetate, ethyl acrylate-methacrylamide- ethyl chloroacrylate, vinyl chloride-vinylidene chloride-vinyl acetate, etc.

Other presently employed polymers of compounds having the ethylenic group, $>C=C<$, are the homopolymers, copolymers and terpolymers of the α,β-olefinic dicarboxylic acids and the derivatives thereof such as the anhydrides, esters, amides, nitriles and imides, e.g., methyl, butyl, 2-ethylhexyl or dodecyl fumarate or maleate, maleic, chloromaleic, citraconic or itaconic anhydride, fumaronitrile, dichlorofumaronitrile or citracononitrile, fumaramide, or maleamide; malemide or N-phenylmalemide, etc. Examples of particularly useful copolymers and terpolymers prepared from the α,β-olefinic dicarboxy compounds are the copolymers of maleic anhydride and a vinyl compound such as ethylene, propylene, isobutylene, styrene, α-methylstyrene, vinyl acetate, vinyl propionate, methyl isopropenyl ketone, isobutyl vinyl ether, etc., the copolymers of dialkyl fumarate such as ethyl or butyl fumarate and a vinyl compound such as styrene, vinyl acetate, vinylidene chloride, ethyl methacrylate, acrylonitrile, etc.

Readily and advantageously modified by the present halogenated diphosphates are also the polymers and copolymers of unsaturated, cyclic esters of carbonic acid, e.g., homopolymeric vinylene carbonate or the copolymers of vinylene carbonate with ethylenic compounds such as ethylene, vinyl chloride, vinyl acetate, 1,3-butadiene, acrylonitrile, methacrylonitrile, or the esters of methacrylic or acrylic acid.

Advantageously modified by the present halogenated diphosphates are also polymers, copolymers or terpolymers or polymerizable compounds having a plurality of double bonds, e.g., a rubbery, conjugated diene polymerizate such as homopolymerized 2,3-butadiene, 2-chlorobutadiene or isoprene and linear copolymers or terpolymers such as butadiene-acrylonitrile copolymer, isobutylene-butadiene copolymer (butyl rubber) butadiene-styrene copolymer or 2 - chloro - butadiene - vinylidene cyanide-acrylonitrile terpolymer; esters of saturated di- or polyhydroxy compounds with olefinic carboxylic acids such as ethylene glycol dimethacrylate, triethylene glycol dicrotonate or glycerol triacrylate; esters of olefinic alcohols with dicarboxylic acids or with olefinic monocarboxylic acids such as diallyl adipate, divinyl succinate, diallyl fumarate, allyl methacrylate or crotyl acrylate and other diethylenically unsaturated compounds such as diallyl carbonate, divinyl ether or divinylbenzene, as well as the cross-linked polymeric materials such as methyl methacrylate-diallyl methacrylate copolymer or butadiene-styrene-divinylbenzene terpolymer.

Polymerized materials prepared by subsequent reaction of the preformed vinyl polymers, e.g., polyvinyl alcohol, the polyvinyl acetals such as polyvinyl formal or polyvinyl butyral, or completely or partially hydrolyzed polyacrylonitrile are likewise modified in properties by the present halogenated diphosphates to give polymeric materials of enhanced utility.

Polymeric materials with which the present halogenated diphosphates can be employed as adjuvants are also polymers which contain elements such as sulfur, phosphorus, boron or silicon, e.g., the sulfides, sulfones, sulfoxides, sulfites, sulfates and sulfonates such as the polymers and copolymers of vinyl sulfide, vinyl sulfone, 2-propenyl sulfoxide, ethylene sulfonic acid and its salts, esters and amides, and sulfonated polystyrene; the olefin-sulfur dioxide polymers, the phosphines, phosphites, phosphates and phosphonates such as diphenylvinylphosphine, allyl phosphite and methallyl phosphite, ethylenephosphonic acid and styrenephosphonic acids and their salts, esters and amides; the silanes such as dimethylvinylsilane, diphenylvinylsilane and methylphenylvinylsilane, etc.

A class of synthetic polymeric materials with which the present halogenated diphosphate compounds are very useful comprises the cellulose derivatives, e.g., the cellulose esters such as cellulose acetate, cellulose triacetate, or cellulose acetate butyrate, the cellulose ethers such as methyl or ethyl cellulose, cellulose nitrate, carboxymethyl cellulose, cellophane, rayon, regenerated rayon, etc. The phosphorus compounds may be incorporated into films of such cellulose derivatives by adding them to the solutions from which the films are cast or into the melts from which the fibers are extruded.

The present halogenated diphosphates are particularly suited to the modification of liquid resin compositions of the polyester type, e.g., the linear polyesters which are obtained by the reaction of one or more polyhydric alcohols with one or more $\alpha,\beta$-unsaturated polycarboxylic acids alone or in combination with one or more saturated polycarboxylic acid compounds, or the cross-linked polyester resins which are obtained by reacting the linear polyester with a compound containing a $CH_2=C<$ group.

The cross-linking component of the presently modified polyester resin may be, e.g., styrene, the nuclear or side-chained substituted styrenes such as 3,4-dichlorostyrene, $\alpha$-chlorostyrene, $\alpha$-methylstyrene; other vinyl-substituted hydrocarbons such as $\alpha$- or $\beta$-vinylnaphthalene or 4-vinylbiphenyl; the olefinic carboxylic acids and the esters, nitriles, amides and anhydrides thereof such as acrylic acid, methacrylic acid, ethyl acrylate, or acrylonitrile; the vinyl esters such as vinyl acetate or vinyl chloroacetate; the olefinic ketones such as ethyl vinyl ketone and isopropenyl methyl ketones; the alkenes such as isobutylene and 2-pentene; the olefinic ethers such as vinyl ethyl ether and vinyl isobutyl ether; etc.

The epoxy resins are another class of polymeric materials with which the present compounds are compatible and are advantageously used. These resins are condensation products formed by the reaction of a polyhydroxy compound and epichlorohydrin, which condensation products are subsequently cured by addition of cross-linking agents. The hydroxy compound may be, e.g., ethylene glycol, 4,4'-isopropylidenediphenol, etc. The cross-linking agent employed in the curing or hardening step may be a dicarboxylic compound such as phthalic anhydride or adipic acid, but is more generally a polyamine such as ethylene diamine, m- or p-phenylene diamine or diethylenetriamine.

The polyurethanes comprise another class of polymeric materials which are beneficially modified by the present compounds. The polyurethanes, like the above-mentioned polyesters, are commercial materials which are employed in structural applications, e.g., as insulating foams, in the manufacture of textile fibers, as resin bases in the manufacture of curable coating compositions and as impregnating adhesives in the fabrication of laminates of woods and other fibrous materials. Essentially the polyurethanes are condensation products of a diisocyanate and a compound having a molecular weight of at least 500 and preferably about 1500–5000, and at least two reactive hydrogen atoms, i.e., hydrogen atoms determinable by the Zerewitinoff method. The useful active-hydrogen containing compounds may be polyesters prepared from polycarboxylic acids and polyhydric alcohols, polyhydric polyalkylene ethers having at least 2 hydroxy groups, polythioether glycols, polyesteramides, etc.

The polyesters or polyesteramides used for the production of the polyurethane may be branched and/or linear, e.g., the esters of adipic, sebacic, 6-aminocaproic, phthalic, isophthalic, terephthalic, oxalic, malonic, succinic, maleic, cyclohexane-1,2-dicarboxylic, cyclohexane-1,4-dicarboxylic, polyacrylic, naphthalene-1,2-dicarboxylic, fumaric, itaconic, etc., with polyalcohols such as ethylene glycol, diethylene glycol, pentaglycol, glycerol, sorbitol, triethanolamine, di-($\beta$-hydroxyethyl) ether, etc. and/or amino-alcohols such as ethanolamine, 3-aminopropanol, 4-aminopropanol, 5-aminopentanol-1, 6-aminohexanol, 10-aminodecanol, 6-amino-5-methylhexanol-1, p-hydroxymethylbenzylamine, etc.; and with mixtures of the above polyalcohols and amines, ethylene diamine, hexamethylene diamine, 3-methylhexamethylene diamine, decamethylene diamine and m-phenylenediamine, etc. and/or amino-alcohols, etc. In the esterification, the acid per se may be used for condensation or, where desirable, equivalent components such as the acid halide or anhydride may be used.

The alkylene glycols and polyoxyalkylene or polythioalkylene glycols used for the production of the polyurethanes may comprise ethylene glycol, propylene glycol, butylene glycol-2,3, butylene glycol-1,3, 2-methylpentanediol-2,4, 2-ethylhexanediol-1,3, hexamethylene glycol, styrene glycol and decamethylene glycol, etc., and diethylene glycol, triethylene glycol, tetraethylene glycol, polythioethylene glycol, polyethylene glycols 200, 400 and 600, etc., dipropylene glycol, tripropylene glycol, trithiopropylene glycol, polypropylene glycols 400, 750, 1,200 and 2,000, etc.

Broadly, any of the polyesters, polyisocyanate-modified polyesters, polyesteramides, polyisocyanate-modified polyesteramides, alkylene glycols, polyisocyanate-modified alkylene glycols, polyoxyalkylene glycols and polyisocyanate-modified polyoxyalkylene glycols, etc. having free reactive hydrogen atoms, free reactive carboxylic and/or especially hydroxyl groups may be employed for the production of the polyurethanes. Moreover, any organic compound containing at least two radicals selected from the class consisting of hydroxyl and carboxyl groups may be employed.

The organic polyisocyanates useful for the production of the polyurethanes include ethylene diisocyanate, ethylidene diisocyanate, propylene-1,2-diisocyanate, butylene-1,3-diisocyanate, hexylene-1,6-diisocyanate, cyclohexylene-1,2-diisocyanate, m-phenylene diisocyanate, 2,4-toluylene diisocyanate, 2,6-toluylene diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 3,3'-dichloro-4,4'-biphenylene diisocyanate, triphenylmethane triisocyanate, 1,5-naphthalene diisocyanate or polyisocyanates in a blocked or inactive form such as the bisphenyl carbamates of toluylene diisocyanate, p,p'-diphenylmethane diisocyanate, p-phenylene diisocyanate and 1,5-naphthalene diisocyanate, etc.

For preparation of the flame-retardant polyurethanes, the present phosphorus compounds are preferably added to a mixture of the reactants and catalyst before hardening. The hardened molded pieces or foams are rendered flame-retardant by the inclusion therein of the halogenated diphosphate in quantities of, say, from 2% to 25% by weight of the polyurethane. Simultaneous plasticizing property is evidenced and continues to be demonstrated until the quantity of halogenated diphosphate is substantially equal to that of the polyurethane. Use of the present phosphates in the polyurethane foams can also increase flexibility and, in some applications, improve the mechanical properties of the foams.

Phenolic resins are also beneficially modified by the present halogenated diphosphates, which compounds are incorporated into the resin either by milling in molding applications or by addition to film-forming or impregnating and bonding solutions previous to casting. Phenolic resins with which the present compounds are employed are, for example, the phenol-aldehyde resins prepared from phenols such as phenol, cresol, xylenol, resorcinol, 4-butylphenol, 4-phenylphenol, and aldehydes such as formaldehyde, acetaldehyde, or butyraldehyde in the presence of either acidic or basic catalysts, depending upon whether the resin is intended for use as a molding or extruding resin or as the resin base in coating and impregnating compositions.

The aminoplasts comprise another group of aldehyde resins which are beneficially modified by the present halogenated diphosphates. Examples thereof are the heat-convertible condensation products of an aldehyde with urea, thiourea guanidine, cyanamide, dicyandiamide, alkyl or aryl guanamines, and the triazines such as melamine, 2-chloro-4,6-diamino-1,3,5-triazine and 2-hydroxy-4,6 - diamino-1,3,5-triazines. The present adjuvants are compatible with the aminoplasts; and depending upon the quantity of halogenated diphosphate used, they serve to plasticize them, and to render them fire-retardant. When the aminoplasts are destined for use as impregnating agents, bonding adhesives, coatings and casting of films, the phosphorus compounds are incorporated into solutions or suspensions in which the aminoplast is carried. The resulting mixtures give strong, fire-retardant laminates when sheets of paper, glass cloth or fabric are impregnated therewith and cured.

Also beneficially modified by the present halogenated diphosphates are the nylons, i.e., the superpolyamides which are generally obtained by the condensation of a diamine, e.g., hexamethylenediamine with a dicarboxylic acid, e.g., adipic acid. Depending upon the quantity of halogenated diphosphate employed and the individual nature of the compound, there are obtained flame-retardant, dye receptor, and/or plasticizing effects.

Other polyamides with which the present halogenated diphosphates are beneficially employed, e.g., for improvement in reduced burning rates, are the polypeptides which may be prepared, e.g., by reaction of N-carbobenzyl oxyglycin with glycine or a mixture of glycine and lysine, or an N-carboxy amino acid anhydride such as N-carboxy-DL-phenyl-alanine anhydride; the polymeric lactams, e.g., polycaprolactam, piperidone, 2-oxohexamethyleneimine and other cyclic amides. The present halogenated diphosphates can be incorporated into molding or extruding compositions for plasticizing and flame-retardant effect and/or to serve as mold lubricants.

The present halogenated diphosphates are also advantageously employed as adjuvants for polymeric aldehydes, e.g., homopolymeric, high-molecular weight formaldehyde.

The present halogenated diphosphates are also adjuvants for linear polymers obtained by the self-condensation of bifunctional compounds generally, e.g., the polyethers which are derived by the self-condensation of dihydric alcohols such as ethylene glycol, propylene glycol or hexamethylene glycol; the polyesters which are obtained by the self-condensation of hydroxy acids such as lactic acid or 4-hydroxybutyric acid, the polyamides which are prepared by the self-condensation of amino carboxylic acids such as 4-aminobutyric acid or 6-aminocaproic acid; the polyanhydrides which are formed by the self-condensation of dicarboxylic acids such as sebacic acid or adipic acid, etc. The present halogenated diphosphates are plasticizing flame-retardants for such self-condensation products, generally; and where transparentizing effect and dye receptivity are lacking, the phosphates are often instrumental in ameliorating such deficiencies.

The present halogenated diphosphates are likewise advantageously employed with the silicone resins, i.e., the linear polymers which have the repeating unit:

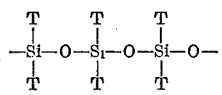

where T denotes an organic radical such as the methyl or phenyl radical, as well as the cross-linked modifications thereof, e.g., cross-linked polymeric divinyltetramethyldisiloxane. The present compounds have a beneficial effect on the mold shrinkage properties and the dimensional stabilities of the thermo-setting polymers and also impart plasticizing and transparentizing effects. In bonding and laminate applications tensile strength properties of the siloxane resins are improved.

The flammability test for measuring the burn qualities of the presently provided polymer systems was for the most part essentially the standard burn test known as ASTM–D1692–D59T or modifications thereof. In general, this test consists of igniting a 6 x 2 by ½ inch block of the polymer sample in a controlled draft tower and determining the manner in which it burns. The sample is supported on a ¼ inch wire screen with the 6 by 2 inch dimensions of the polymer sample held horizontal. Two lines (4 inches apart) are drawn on the sample of polymer. The sample is ignited with a burner (extreme end of sample). Ignition time is one minute or until the flame front reaches the one inch gauge line, whichever occurs first. The burner is removed after ignition.

Either of two descriptions was assigned to polymer samples which did not burn.

(1) Non-burning
(2) Self-extinguishing

A polymeric composition was considered "non-burning" if there was no evidence of burning (flame or progressive glow) after removal of the burner. A "self-extinguishing" sample was one that continues to burn after removal of the burner but the flame goes out before the second gage line was reached.

The invention is further illustrated by, but not limited to the following examples:

*Example 1*

Polyester compositions containing various percentages of halogenated organic diphosphates as flame retardants were prepared as follows:

To 18.4 parts of a commercially available polyester copolymer prepared by condensing 2.1 moles of propylene glycol, 1 mole of phthalic anhydride, and 1 mole of maleic anhydride, processed to an acid number of about 40 at 200° C., cooled to room temperature and dissolved in styrene monomer which polymerizes with the maleic anhydride upon curing, said styrene comprising 1 part of the composition with 2 parts of the polyester, there was added 0.6 part of 50% benzoyl peroxide as catalyst, and 1.0 part of the halogenated organic diphosphate ester as additive to make 20 parts of a polyester composition containing the additive in 5% by weight concentration.

Polyester compositions containing 10% by weight and 17.5% by weight of each additive were also prepared by admixing the ingredients in the following proportions:

| 10% Additive | Parts | 17.5% Additive | Parts |
|---|---|---|---|
| Polyester | 17.4 | Polyester | 15.9 |
| Catalyst | 0.6 | Catalyst | 0.6 |
| Additive | 2.0 | Additive | 3.5 |
| Total | 20.0 | Total | 20.0 |

Each 20 gram polyester composition was heated in an oil bath at 83° C. for 20 minutes, after which it was removed from the bath and placed in an oven at 130° C. for several hours.

Polyester compositions containing each of the following additives in each of the above concentrations were prepared:

A. 2,2-bis(bromomethyl)-1,3-propylenebis(2-bromoethyl 2-chloroethyl phosphate)
B. 2,2-bis(chloromethyl)-1,3-propylenebis[bis(2 - chloroethyl) phosphate]
C. 2,2-bis(bromomethyl)-1,3 - propylenebis(2 - bromo-3-chloropropyl 2,3-dichloropropyl phosphate)
D. 2,2 - bis(chloromethyl) - 1,3 - propylenebis[bis(2,3-dichloropropyl) phosphate]

Polyester compositions containing the above additives were tested for burning characteristics according to the ASTM–D1692–D59T test modified as follows:

The polyester samples were cut into slices 1" x 1" x ³⁄₁₆" in size, placed on a ¼" wire screen, and placed 1⅜" over a Meeker burner flame. They were ignited for 20 seconds and then after the flame was removed, the burning time was noted. If the sample was self-extinguishing, ignition was repeated for 15 seconds. Temperature at the sample surface during ignition was about 1600° F. Samples containing 10 and 17.5% of 2,2-bis(bromomethyl)-1,3-propylenebis-(2-bromoethyl 2-chloroethyl phosphate) and 17.5% of 2,2 - bis(bromomethyl) - 1,3 - propylenebis(2-bromo - 3 - chloropropyl 2,3 - dichloropropyl phosphate) were self-extinguishing.

*Example 2*

This example illustrates the preparation of epoxy polymeric compositions containing major proportions of polyepoxy resins and minor proportions of halogenated diphosphate esters.

With 3 g. of a commercially available condensation product of linoleic acid and a polyamine having an amine value of from 290–320 and a viscosity of 80–120 poises at 40° C. there was mixed 7 g. of the diglycidyl ether of Bisphenol A and a sufficient amount of one of the following halogenated diphosphate esters to make a composition having 16.5% by weight based on the weight of the total composition, of the halogenated diphosphate ester and the resulting reaction mixture was poured into a small aluminum pan which had been coated with a silicone grease to prevent sticking. The product was heated in an oven at 100° C. for two hours.

Samples of the epoxy resinous product containing 16.5% by weight of one of the listed chemicals below were cut into strips 2.5″ long, 1″ wide, and ³⁄₁₆″ thick and then burned according to the standard procedure, ASTM–D1692–D59T, except that no wire screen was used for support, each sample being held in place by a clamp. No gage marks were used. Samples were ignited for 30 sec. and then observed for burning characteristics. The chemical added to the resin composition was one of the following:

A. 2,2-bis(bromomethyl)-1,3-propylenebis(2-bromo-ethyl 2-chloroethyl phosphate)
B. 2,2-bis(chloromethyl)-1,3-propylenebis[bis(2 - chloroethyl) phosphate]
C. 2,2-bis(bromomethyl)-1,3 - propylenebis(2 - bromo-3-chloropropyl 2,3-dichloropropyl phosphate)
D. 2,2 - bis(chloromethyl) - 1,3 - propylenebis[bis(2,3-dichloropropyl) phosphate]
E. Control (no added chemical)

Each sample was ignited for 30 seconds and then observed for burning characteristics with the following results:

| Sample | Effect on Sample after Ignition Flame Removed |
| --- | --- |
| A | Flame went out 1.5 secs. after flame removed. |
| B | Flame went out 120 secs. after flame removed. |
| C | Flame went out 1.5 secs. after flame removed. |
| D | Flame went out 3 secs. after flame removed. |
| E | Burned completely after flame removed. |

*Example 3*

Flexible polyurethane foam compositions containing various percentages of halogenated organic diphosphates were prepared as follows:

A first prepared mixture of 650 parts of a polyoxypropylene triol having a hydroxyl number of 56.3 (prepared from glycerin and propylene oxide), 6.5 parts of a silicone surfactant used as a foam stabilizer, 1.95 parts of stannous octoate, 3.25 parts of N-methyl morpholine, and 0.325 part of 1-methyl-4-(dimethylaminoethyl)piperazine, as catalysts, was blended for 0.5 hour at 25° C., and divided into portions of 101.85 g.

To one portion of 101.85 g. of the above mixture there was added 9.11 g. of 2,2-bis(bromomethyl)-1,3-propylenebis(2-bromoethyl 2-chloroethyl phosphate), 2.9 g. of water, and then, after stirring the mixture for 30 seconds, 38 g. of tolylene diisocyanate was added, and the mixture was stirred until foaming started, and then it was poured into a container lined with aluminum foil, which had been preheated to 100° C. After covering the foaming mixture, it was heated at 100° C. for 4 minutes in a forced air oven, removed from the oven, squeezed to one-half its initial thickness, and then placed in an oven at 130° C. for 1 hour. This polyurethane foam contained 6% by weight of the halogenated organic diphosphate ester.

Other polyurethane foam compositions were prepared so as to contain 8% and 10% quantities of halogenated organic diphosphate esters in a similar manner. Thus, to make a polyurethane foam composition containing 8% of the above additive, there was added 12.44 g. of the above compound to a 101.85 g. portion of the mixture; to make a foam composition containing 10% of the additive 16.00 g. of the halogenated organic phosphorus ester was used, the other ingredients of the composition remaining in the same proportions as indicated above.

Using the above described procedure, flexible polyurethane foam compositions containing the indicated percentages of various halogenated organic diphosphate esters were prepared and burned according to the standard ASTM–D1692–D59T with the following results:

| Halogenated Diphosphate | Percentage | Burn Class |
| --- | --- | --- |
| A | 6 | NB[1]/SE.[2] |
|   | 8 | NB. |
|   | 10 | NB. |
| B | 6 | SE. |
|   | 8 | SE. |
|   | 10 | SE. |
| C | 6 | SE. |
|   | 8 | SE. |
|   | 10 | NB. |
| D | 8 | SE. |
|   | 10 | SE. |
| Control (No additive) |  | B.[3] |

[1] NB—non-burning.
[2] SE—self-extinguishing.
[3] B—burned completely.
Halogenated diphosphate:
  A. 2,2-bis (bromomethyl)-1,3-propylenebis (2-bromoethyl 2-chloroethyl phosphate).
  B. 2,2-bis (chloromethyl)-1,3-propylenebis [bis-(2-chloroethyl) phosphate].
  C. 2,2-bis (bromomethyl)-1,3-propylenebis (2-bromo-3-chloropropyl 2,3-dichloropropyl phosphate).
  D. 2,2-bis (chloromethyl)-1,3-propylenebis [bis-(2,3-dichloropropyl) phosphate].

*Example 4*

To 100 parts of a polyvinyl chloride resin there was added 50 parts of a 1:1 mixture of dioctyl phthalate and 2,2 - bis(bromomethyl) - 1,3-propylenebis-(2-bromoethyl 2-chloroethyl phosphate) as plasticizer. The combination was placed on hot mill rolls and blended. When thoroughly blended, the product was stripped from the roll and pressed into 4″ by 4″ by ¹⁄₁₆″ square shaped pieces which were soft, pliable plastic. After a two week period, the sample showed no oiling out of the 2,2-bis(bromoethyl - 1,3 - propylene - bis(2-bromoethyl 2-chloroethyl phosphate).

*Example 5*

Rigid polyurethane foam compositions containing various halogenated organic diphosphates were prepared as follows:

To a mixture of 63.4 parts of a polyoxypropylene triol having an average hydroxyl number of 379.5, 0.05 part of stannous octoate as catalyst, from 12.6 to 16 parts of trichlorofluoromethane as blowing agent, and 0.30 part of a water soluble organo-silicone oil copolymer having a viscosity of about 900 centistokes at 25° C. and a specific gravity of 1.03 as a foam stabilizer, and the indicated percentage (below) of one of the halogenated organic diphosphates, there was added 36.6 parts of tolylene diisocyanate and as foaming started the reaction mixture was poured into a kraft paper container and allowed to set until cured. Higher amounts of blowing agent were used with the higher concentrations of additives to make a uniform density foam. The preceding foams were burned using ASTM-D1692-59T giving the following table:

| Compound | Percent Added (based on wt. of total composition) | Density, gm./cm.³ | Burn Rating |
| --- | --- | --- | --- |
| Control | None | 0.0383 | Burns. |
| A | 6 | .0382 | SE. |
|   | 9 | .0403 |   |
|   | 12 | .0399 |   |
|   | 16 | .0421 |   |
| B | 6 | .0375 | SE. |
|   | 9 | .0356 |   |
|   | 12 | .0396 |   |
|   | 16 | .0494 |   |
| C | 12 | .0412 | SE. |
|   | 16 | .0494 |   |
| D | 16 | .0448 | SE. |

A. 2,2-bis(bromoethyl)-1,3-propylenebis (2-bromoethyl 2-chloroethyl phosphate).
B. 2,2 - bis(chloromethyl)-1,3-propylenebis[bis - (2-chloroethyl) phosphate].
C. 2,2 - bis(bromoethyl) - 1,3 - propylenebis(2 - bromo - 3-chloropropyl 2,3-dichloropropyl phosphate).
D. 2,2 - bis(chloromethyl) - 1,3 - propylenebis[bis(2,3 - dichloropropyl) phosphate].
SE=self extinguishing.

*Example 6*

Samples of a commercial cellulose acetate butyrate having an average acyl content of 13.0 percent acetyl and 37 percent butyryl and a viscosity range of 17–33 seconds (64–124 poises) as determined by ASTM method D–1343–54T in the solution described as Formula A, ASTM method D–871–54T were blended on hot mill rolls and various percentages of 2,2-bis(bromomethyl)-1,3-propylenebis(2-bromoethyl-2-chloroethyl phosphate) and 2,2 - bis(bromomethyl)-1,3-propylenebis(2-bromo-3 chloropropyl 2,3-dichloropropyl phosphate) were added. The final compositions had from 10% to 15% by weight of the added ester. All the samples were self extinguishing according to the standard ASTM-D1692-D59T burn test.

*Example 7*

To melted samples of a natural high molecular weight low density polyethylene having a density of 0.918, a melt index of 0.3 gm./10 minutes, a softening temperature of 105°–110° C. and a tensile strength (ultimate) of 2300 p.s.i.g. various amounts of one of the indicated halogenated organic diphosphate esters sufficient to make compositions wherein the added ester comprised from 4 to 8% of the total weight of the composition were added. All samples containing as little as 4% by weight of the additive were self-extinguishing according to the standard test ASTM-D1692-D59T. The added compounds giving these results were:

A. 2,2-bis(bromomethyl)-1,3,propylenebis(2-bromoethyl 2,-chloroethyl phosphate),
B. 2,2-bis(chloromethyl)-1,3-propylenebis[bis(2-chloroethyl)phosphate], and
C. 2,2-bis(bromomethyl)-1,3-propylenebis(2-bromo-3-chloropropyl 2,3-dichloropropyl phosphate).

*Example 8*

To melted samples of a commercial rigid polymethylmethacrylate polymer blended on hot mill rolls there was added various quantities of one of the following halogenated diphosphate esters sufficient to impart flame resistant properties thereto. The samples were milled into sheets and burned according to the standard ASTM test method indicated above. A polymer sample containing as little as 11% by weight of "A" below was self-extinguishing. Samples containing 18 to 22% of the esters below were non-burning. The esters added were:

A. 2,2-bis(bromomethyl)-1,3 - propylenebis( - bromoethyl 2-chloroethyl phosphate),
B. 2,2-bis(chloromethyl)-1,3-propylenebis[bis(2 - chloroethyl) phosphate],
C. 2,2-bis(bromomethyl)-1,3-propylenebis(2 - bromo-3-chloropropyl 2,3-dichloropropyl phosphase), and
D. 2,2-bis(choromethyl)-1,3-propylnebis[2,2 - dichloropropyl) phosphate].

*Example 9*

Wood, paper, and cotton were impregnated with various percentages of 2,2-bis(halomethyl)-1,3-propylenebis(halophosphate) compounds using the following procedure:

Using a volatile solvent, such as methyl ethyl ketone, the additive was dissolved in the solvent, and wood, paper, or cotton was soaked in the resulting solution. The solvent was then evaporated off leaving the additive impregnated in the wood, paper, or cotton. To obtain more rapid absorption, the wood was soaked in the impregnating solution under vacuum.

By expeimentation we found that to obtain an impregnated wood having about 15% by weight of additive therein, a 30% solution of the additive was needed when methyl ethyl ketone was used as solvent. On this basis it is then possible to obtain desired varied percentages of additive in the wood, paper, or cotton by varying the percent of additive in the impregnating solution. The solution needed to obtain a desired percentage of additive in the wood, paper, or cotton was roughly 2 times the percentage desired in the impregnated material.

The wood impregnation procedure was as follows:
Maple wood strips, 6 by ¾ by ¹⁄₁₆ inch, were dried in an oven at 130° C. for at least 15 minutes and then weighed. The wood strips were then placed in test tubes containing 60 cc. of solution containing the desired percent of additive as indicated above. The test tubes containing the wood in the impregnating solution were then placed under a vacuum of 130 to 135 mm. Hg, slowly at first to prevent suction of the impregnating solution. After 3 minutes the vacuum was relieved and the open system was allowed to stand for 1 minute after which time the wood was removed, wiped once with a paper towel and weighed. The wood strips were air dried for two minutes and then in an oven at 130° C. for 30 minutes. The percent additive in the wood was calculated as follows.

Calculate percent additive in wood as follows: Let—

$x$=dry weight of wood
$y$=dry weight of wood+weight of solvent and additive picked up in impregnation
$Z$=weight ratio of additive to solvent prepared for impregnation then $$\text{Percent additive in wood} = \frac{(y-x)Z}{x+(y-x)Z} \cdot 100$$

Wood samples containing about 10 and 15% by weight of the additive were prepared by the above procedure. Solutions of methyl ethyl ketone containing 30% by weight of the chemical were used to make wood samples having 15% of the added chemical. The 30% solution was then diluted to 20% by weight concentration for impregnated wood samples having 10% added chemical.

Each sample was subjected to a standard burning test, ASTM D1692–59T (1959), except that no wire screen was used to support the wood samples. The results were as follows for the wood samples impregnated with the indicated percentage of the following compounds A, B, C, D- identified in Example 2.

IMPREGNATED WOOD BURN DATA

| Additive | Percent | Burn Class |
|---|---|---|
| A | 18 | NB. |
| A | 10 | NB. |
| C | 12 | NB. |
| C | 10 | SE. |
| B | 16.5 | NB. |
| D | 13 | NB. |
| Control (no additive) | | B. |

Notes:
NB = Non-Burning.
SE = Self Extinguishing.
B = Burns completely.

Strips (6" by 2") of paper Whatman filter paper No. 3) were dried in an oven at 130° C. for 10 minutes and then weighed. The weighed strips of paper were placed in glass bottles containing about 50 cc. of a solution of methyl ethyl ketone having various percentages of chemical to be tested A, B, C, or D, identified above, dssolved therein. The bottles were tilted if necessary to cover completely the paper strips with impregnating solution. After 1 minute the paper was removed, shaken to remove excess solution, and pressed between two paper tissues with a 1000 gram weight. The paper strips were weighted, and dried in air for 2 minutes and then in an oven at 130° C. for 10 minutes. It was found by experimentation that to obtain an impregnated paper having about 20% by weight of the added chemical, a solution of about 30% by weight of the chemical in the solvent was needed.

IMPREGNATED PAPER BURN DATA

| Added Ester | Percent | Burn Class |
|---|---|---|
| A | 20.8 | NB.[1] |
| B | 20.8 | NB. |
| C | 20.8 | NB. |
| D | 20.7 | NB/SE.[2] |
| Control | ([3]) | B. |

[1] NB = Non-Burning.
[2] SE = Self-Extinguishing.
[3] No additive.

Cotton patches were impregnated in the same way as the paper samples with compounds A, B, C, or D, as identified above, with the following exception: to obtain the desired percentage of additive in cotton it was found by experimentation that a 25% by weight concentration of added chemical in a methyl ethyl ketone solvent is needed to give a 20% by weight concentration of the chemical in cotton. On this basis, samples containing various concentrations of the added chemicals were prepared and burned according to the standard test. The results were as follows:

IMPREGNATED COTTON BURN DATA

| Added Chemical | Percentage | Burn Class |
|---|---|---|
| Control | None | B. |
| A | 12.8 | SE. |
| A | 19.0 | NB. |
| B | 10 | SE. |
| B | 19.5 | NB. |
| C | 18.5 | SE. |
| D | 18 | SE. |

*Example 10*

To melted samples of commercially available natural crystal polystyrene blended on hot mill rolls there was added sufficient amounts of one of the following halo- genated organic diphosphate esters to make compositions containing from 4 to 16.5% by weight of the added ester. Such compositions were pressed into sheets and cut into the desired size and burned according to the ASTM D1692–D59T test. All samples containing as low as 4% by weight of the additive were self-extinguishing. Samples containing 16.5% by weight of the added diphosphate ester were non-burning. The added compounds were:

A. 2,2-bis(bromomethyl)-1,3-propylenebis(2-bromoethyl 2-chloroethyl phosphate)
B. 2,2-bis(chloromethyl)-1,3-propylenebis[bis(2-chloroethyl) phosphate]
C. 2,2-bis(bromomethyl)-1,3-propylenebis(2-bromo-3-chloropropyl 2,3-dichloropropyl phosphate), and
D. 2,2-bis(chloromethyl)-1,3-propylenebis[bis(2,3-dichloropropyl) phosphate]

*Example 11*

Flame-retarding effects also are obtained when 2,2-bis(bromomethyl)-1,3 - propylenebis(2 - bromo-3-butenyl 2-chloroethyl phosphate) is added to a 10% solution of a 50:50 molar ratio styrene-methyl methacrylate copolymer in benzene in an amount sufficient to be 25% by weight of the total solids content. Films cast from the resulting mixture are flexible, clear and colorless, and the film surfaces are free of exudation.

*Example 12*

A copolymeric composition having improved burn resistant properties is also obtained by adding 2,2-bis(chloromethyl)-1,3-propylenebis(2 - bromododecyl 2 - chloropropyl phosphate) in an amount sufficient to be 25% by weight based on the weight of the total solids content of a 10% benzene solution of a 72:28 molar ratio styrene-acrylonitrile copolymer.

*Example 13*

To a granular blend of a polystyrene and butadiene-styrene copolymer containing 6.5% by weight of the copolymer there is added 4% by weight of 2,2-bis(bromomethyl)-1,3-propylenebis(2 - bromo-3-chloropropyl 2,3-dichloropropyl phosphate) by blending for 15 minutes in a tumbling type laboratory blender. The mixture is then extruded through a 1" single screw extruder at 400° F. into 3/16" diameter rods.

Extruded rods of the above composition are self-extinguishing upon removal from a Bunsen burner flame in a draft free hood. A similarly extruded blend of polystyrene and butadiene-styrene copolymer containing none of the above compound continues to burn rapidly, drip flame, and emit heavy black smoke after the first ignition.

*Example 14*

To a 10% ethylene dichloride solution of polyvinyl acetate there is added sufficient 2,2-bis(bromomethyl)-1,3-bis-(2 - bromo-3-phenylpropyl 2 - chlorobutyl phosphate) in a quantity which is one half by weight to that of the polyvinyl acetate present in the solution. Films cast from the resulting mixture are flexible and self-extinguishing.

*Example 15*

To a 5% solution of a polyvinyl formal in ethylene dichloride there is added 2,2-bis-(bromomethyl)-1,3-propylenebis(2-bromoethyl 2-chloroethyl phosphate) in a quantity which is 25% by weight of the total solids content of the solution. Films cast from such solution are clear and colorless after air-drying for 24 hours and when held just outside the outer cone of a Bunsen burner flame, exhibit no ignition to flame. Films of polyvinyl formal, alone that is, "controls" prepared in the absence of a phosphorus compound, burst into flame under the same circumstances.

*Example 16*

To a polymer blend of an unsaturated polyester prepared by condensing 1 mole of maleic anhydride, 1 mole of phthalic anhydride, and 2.1 moles of propylene glycol to an acid number of about 40 at 200° C., cooling the mixture and dissolving the mixture in a sufficient amount of styrene monomer so that the resulting mixture comprises 30 parts styrene monomer to 70 parts of the polyester, there is added sufficient 2,2-bis(bromomethyl)-1,3-propylenebis(2-bromo-3-acrylyloxypropyl 2-chloropropyl phosphate) to equal 20% by weight of the total composition. A small amount (3% w./w.) of benzoyl peroxide is added, and the resulting mixture is polymerized at 80° C. The resulting copolymer system is a non-burning, thermosetting resin.

*Example 17*

This example compares the burn characteristics of polymer systems of this invention with polymer systems having commercially available halogenated phosphates therein.

Samples of natural crystalline polystyrene were blended on mill rolls with sufficient amounts of each of the following compounds to equal 4% by weight of the total compositions. Each sample was ignited and observed for burning characteristics according to the standard ASTM–D1692–D59T procedure and were classified as burning, self-extinguishing, or non-burning.

Compound:              Burn characteristic
   2,2 - bis(bromomethyl) - 1,3 - propylene - bis
     (2-bromoethyl 2-chroloethyl phosphate) ____ SE
   2,2 - bis(chloromethyl) - 1,3 - propylene - bis
     [bis(2-chloroethyl) phosphate] _____ SE
   2,2 - bis(chloromethyl) - 1,3 - propylenebis-[bis
     (2,3-dichloropropyl) phosphate] _____ SE
   Tris(2-chloroethyl) phosphate _____ B
   Tris(2,3-dichloropropyl) phosphate _____ B At a concentration of 16.5% based on the weight of the total composition of the following compounds in polystyrene polymer systems prepared as above gave the following burn characteristics.

Compound:              Burn characteristics
   2,2 - bis(bromomethyl) - 1,3 - propylene - bis
     (2-bromoethyl 2-chloroethyl phosphate) ____ NB
   2,2 - bis(bromomethyl) - 1,3 - propylene - bis
     (2-bromo-3-chloropropyl 2,3 - dichloropropyl
     phosphate) _____ NB
   2,2 - bis(chloromethyl) - 1,3 - propylene - bis
     [bis(2,3-dichloropropyl) phosphate] _____ NB
   Tris(2-chloroethyl) phosphate _____ SE The impregnated cotton compositions containing 20% by weight based on the weight of the total composition of each test compound the burn characteristics were as follows:

| Compound | Burn Characteristics | |
|---|---|---|
| | AP | HA |
| 2,2-bis(bromomethyl)-1,3-propylenebis (2-bromoethyl 2-chloroethylphosphate). | NB. | SE. |
| 2,2-bis(chloromethyl)-1,3-propylenebis[bis(2-chloroethyl) phosphate]. | NB. | SE. |
| Tris (2-chloroethyl) phosphate | SE. | B. |

See notes, end of tables.

In heat-aged (HA) impregnated wood compositions containing 10% and 15% by weight of the phosphorous compound based on the weight of the total composition the burn characteristics were as follows:

| Compound | Burn Characteristics | |
|---|---|---|
| | Percent of Compound | Classified |
| 2,2-bis(bromomethyl)-1,3-propylenebis(2-bromoethyl 2-chloroethyl phosphate). | 15 | NB. |
| 2,2-bis(chloromethyl)-1,3-propylenebis[bis(2-chloroethyl) phosphate]. | 10 | SE. |
| 2,2-bis(bromomethyl)-1,3-propylene-bis(2-bromo-3-chloropropyl) 2,3-dichloropropyl phosphate). | 10 | SE. |
| 2,2-bis(chloromethyl)-1,3-propylene-bis[bis(2, 3-dichloropropyl) phosphate]. | 10 | SE. |
| Tris(2-chloroethyl) phosphate | 10 | B. |
| Tris(2-chloroethyl) phosphate | 15 | B. |

See notes, end of tables.

In heat-aged impregnated paper compositions containing 20% by weight of the following test compounds, based on the weight of the total composition, the burn characteristics are as follows.

Compound:             Burn characteristics
   2,2 - bis(bromomethyl) - 1,3 - propylenebis(2-
     bromoethyl 2-chloroethyl phosphate) _____ SE
   2,2 - bis(chloromethyl) - 1,3 - propylenebis[bis
     (2-chloroethyl) phosphate] _____ SE
   Tris(2-chloroethyl) phosphate _____ B Notes:
   B=burns.
   SE=self-extinguishing.
   NB=non-burning.
   AP=as prepared.
   HA=heat aged.

Reasonable variations and modifications of the invention as described are within the scope of the invention, the essence of which is that there have been provided (1) methods for improving the burn-resistance properties of polymeric compositions, (2) polymeric compositions having improved burn-resistance properties, and (3) polymer compositions having improved flexibility.

What is claimed is:

1. An organic flame resistant composition comprising an organic polymer in admixture with up to 50 percent of the total composition, of a halogenated diphosphate having the formula

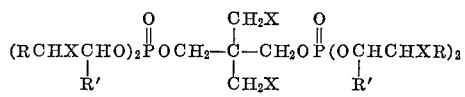

wherein each X is selected from the group consisting of bromine and chlorine; each R is selected from the group consisting of hydrogen, and hydrocarbyl, halohydrocarbyl, hydrocarbyloxy, hydrocarbyloxyalkyl, and hydrocarbyl-C(O)O-alkyl radicals having from 1 to 18 carbon atoms; and each R' is selected from the group consisting of hydrogen, lower alkyl, and lower haloalkyl radicals and is hydrogen when R is a hydrocarbyloxyalkyl and when R is hydrocarbyl-C(O)-O-alkyl the carbon atom content of each of the phosphorus bonded ester moieties containing R and R' being from 2 to 20 carbon atoms, with the proviso that the average carbon content in the phosphorus bonded ester radicals containing R and R' of a given halogenated diphosphate molecule is from 2 to about 12 carbon atoms for each of such ester moieties.

2. An organic flame resistant composition according to claim 1 wherein the organic polymer is a natural polymer.

3. An organic flame resistant composition according to claim 1 wherein the organic polymer is a synthetic polymer.

4. An organic flame resistant composition as defined in claim 1 wherein the halogenated diphosphate has the formula

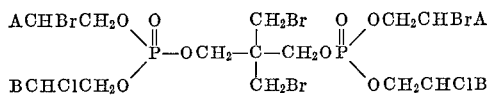

wherein A is a hydrocarbyl-C(O)O-alkyl radical having from 3 to 18 carbon atoms and B is a lower alkyl radical.

5. An organic flame resistant composition as defined in claim 1 wherein the halogenated diphosphate has the formula

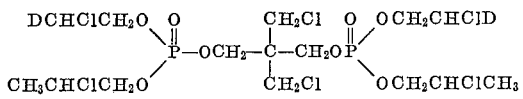

wherein D is a hydrocarbyloxyalkyl radical having from 2 to 18 carbon atoms.

6. An organic flame resistant composition as defined in claim 1 wherein the halogenated diphosphate has the formula

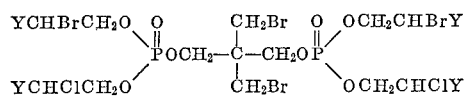

wherein Y is selected from the group consisting of hydrogen and the chloromethyl radical.

7. An organic flame resistant composition as defined in claim 1 wherein the halogenated diphosphate has the formula

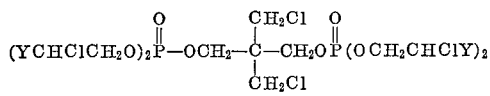

wherein Y is selected from the group consisting of hydrogen and the chloromethyl radical.

8. An organic flame resistant composition as defined in claim 6 wherein the halogenated diphosphate is 2,2-bis(bromomethyl)-1,3-propylenebis(2-bromoethyl 2-chloroethyl phosphate).

9. An organic flame resistant composition as defined in claim 6 wherein the halogenated diphosphate is 2,2-bis-(bromethyl - 1,3 - propylenebis(2 - bromo - 3 - chloropropyl 2,3-dichloropropyl phosphate).

10. An organic flame resistant composition as defined in claim 7 wherein the halogenated diphosphate is 2,2-bis-(chloromethyl) - 1,3 - propylenebis[bis(2 - chloroethyl) phosphate].

11. An organic flame resistant composition as defined is claim 7 wherein the halogenated diphosphate is 2,2-bis(chloromethyl) - 1,3 - propylenebis[bis(2,3 - dichloropropyl)phosphate].

12. An organic flame resistant composition as defined in claim 3 wherein the polymer is a polyurethane.

13. An organic flame resistant composition as defined in claim 3 wherein a monomer used to prepare the synthetic polymer is styrene.

14. An organic flame resistant composition as defined in claim 3 wherein the polymer is an acrylate polymer.

15. An organic flame resistant composition as defined in claim 3 wherein the polymer is a polyester polymer.

16. An organic flame resistant composition as defined in claim 3 wherein the polymer is a polyolefin.

17. An organic flame resistant composition comprising a polyurethane polymer in admixture therewith up to 50 percent of the total composition of a halogenated diphosphate having the formula

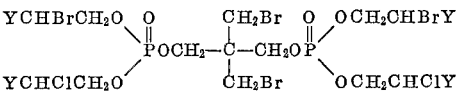

wherein Y is selected from the group consisting of hydrogen and the chloromethyl radical.

18. An organic flame resistant composition according to claim 17 wherein the halogenated diphosphate is 2,2-bis(bromomethyl) - 1,3 - propylenebis(2 - bromoethyl 2-chloroethyl phosphate).

19. An organic flame resistant composition according to claim 17 wherein the halogenated diphosphate is 2,2-bis(bromomethyl) - 1,3 - propylenebis(2-bromo-3-chloropropyl 2,3-dichloropropyl phosphate).

20. An organic flame resistant composition comprising a polyester polymeric composition in admixture therewith up to 50 percent of the total composition, of a halogenated diphosphate having the formula

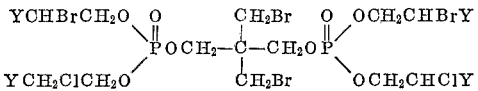

wherein Y is selected from the group consisting of hydrogen and the chloromethyl radical.

21. An organic flame resistant composition according to claim 20 wherein the halogenated diphosphate is 2,2-bis(bromomethyl) - 1,3 - propylenebis(2-bromo-3-chloropropyl 2,3-dichloropropyl phosphate).

22. An organic flame resistant composition comprising an acrylate polymer in admixture therewith up to 50 percent of the total composition, of a halogenated diphosphate having the formula

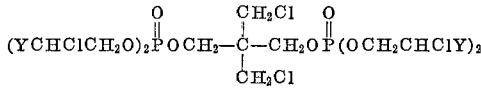

wherein Y is selected from the group consisting of hydrogen and the chloromethyl radical.

23. An organic flame resistant composition according to claim 22 wherein the halogenated diphosphate is 2,2-bis(chloromethyl) - 1,3 - propylenebis[bis(2,3 - dichloropropyl) phosphate].

24. An organic composition comprising a major amount of a polyester copolymerized with an amount of 2,2-bis(bromomethyl) - 1,3 - propylenebis(2 - bromo - 3-acrylyloxypropyl 2-chloropropyl phosphate) sufficient to render the resulting composition flame resistant.

No references cited.